(12) United States Patent
Allen

(10) Patent No.: US 7,461,477 B2
(45) Date of Patent: Dec. 9, 2008

(54) MULTI-FUNCTION FISHING CART

(76) Inventor: David Allen, 40-12 209th St., Bayside, NY (US) 11361

( * ) Notice: Subject to any disclaimer, the term of this patent is extended or adjusted under 35 U.S.C. 154(b) by 0 days.

(21) Appl. No.: 11/219,953

(22) Filed: Sep. 6, 2005

(65) Prior Publication Data

US 2007/0051031 A1    Mar. 8, 2007

(51) Int. Cl.
*A01K 97/00* (2006.01)
(52) U.S. Cl. ....................................... 43/54.1
(58) Field of Classification Search ............ 43/54.1, 43/56, 55, 57.1; 280/47.25, 47.26; 114/255; 62/457.1
See application file for complete search history.

(56) References Cited

U.S. PATENT DOCUMENTS

| | | | |
|---|---|---|---|
| 4,033,280 A | 7/1977 | Wood et al. | |
| 4,627,189 A | 12/1986 | Pipin et al. | |
| 4,945,672 A * | 8/1990 | Raia | 43/57 |
| 5,010,681 A | 4/1991 | Cox, Jr. | |
| 5,159,777 A * | 11/1992 | Gonzalez | 43/54.1 |
| 5,611,561 A | 3/1997 | Dale, II | |
| 5,822,916 A * | 10/1998 | Power | 43/57 |
| 6,082,757 A | 7/2000 | Lin | |

(Continued)

*Primary Examiner*—Kurt Rowan
(74) *Attorney, Agent, or Firm*—Richard L. Strauss

(57) ABSTRACT

A portable culling cart is disclosed comprised of a housing, a live well therewithin, a self contained means of filling the live well with water from a marine source, a self contained water circulation/aeration means, a self-contained power source for powering both the means of filling the live well with water and the circulation/aeration means, at least two wheels and a transportation handle. The cart is transported upon said two wheels by a user from site to site utilizing the transportation handle and utilizes powered filling of said live well from a marine source and powered circulation/aeration of water therewithin without need for outside power sources, pumps or manual filling of the live well. In a preferred embodiment, the cart includes at least one electric water pump, at least one electric battery having suitable voltage and amperage to power said at least one electric pump, a length of water pick-up hose having sufficient length to extend from the cart to a marine water source. In the preferred embodiment, the live well includes at least one water inlet and at least one water outlet mounted upon and providing fluid entry/exit to and from said live well. A water valve providing for and enabling control of direction of water flow to and from said live well is disclosed being especially configured to include at least two valve inlets, one valve outlet and three valve settings. The first valve inlet being in fluid connection with the water pick-up hose, the second valve inlet being in fluid connection with the at least one water outlet of said live well and the valve outlet being in fluid connection with the at least one electric water pump wherein. When the valve is placed in a first setting, the valve inlets and outlet are configured to connect the water pick-up hose with the at least one water pump and live well water inlet so as to enable filling thereof. When the valve is placed in a second setting, the valve inlets and outlet are configured to connect the live well water outlet with the at least one water pump and live well water inlet so as to provide circulation and aeration of water within the live well. When the valve is placed in a third setting, fluid connection amongst the at least one water pump, water pick-up hose and live well outlet are closed and sealed.

13 Claims, 5 Drawing Sheets

U.S. PATENT DOCUMENTS

| | | |
|---|---|---|
| 6,200,212 B1 | 3/2001 | Henry et al. |
| 6,467,779 B1 * | 10/2002 | Mills ........................ 280/47.26 |
| 6,550,791 B2 | 4/2003 | Ramsey |
| 6,755,428 B2 * | 6/2004 | Butler ...................... 280/47.26 |
| 6,916,028 B2 * | 7/2005 | Shapiro ................... 280/47.34 |
| 2003/0159418 A1 * | 8/2003 | Lin ............................. 56/14.7 |

* cited by examiner

MULTI-FUNCTION FISHING CART

TECHNICAL FIELD

The present invention relates generally to the art of recreational fishing equipment. More specifically, the present invention relates to portable carts serving multiple fishing support functions such as culling, equipment storage, rod stabilization and the hot/cold storage of refreshments.

BACKGROUND OF THE INVENTION

In many jurisdictions throughout the world, strict regulations restrict the type, size and amount of fish that may be taken by both recreational and professional fisherman. In particular, a maximum number of any given species of fish and/or maximum amount of catch weight may be proscribed by law. One can not, of course, control the size or amount of fish one actually is able to catch in any particular outing. For example, the first fish caught may be the only catch of the day. On the other hand, fish caught later in the day may be much more desirable in regard to size, quality, etc. The regulations controlling the type, weight and amount of fish taken applies to both fisherman aboard vessels as well as recreational fisherman that may fish at docks, bridges, in the shallows or surf.

Culling is an acceptable practice utilized by fisherman wherein initial fish, which may not be desirable in light of the final catch of the day, are viably maintained in a water tank especially used for such purposes often referred to as a "live well". Live wells are often designed and configured to include circulation pumps and/or aerators to provide fish, taken from their natural habitat, with a properly oxygenated environment. Proper aeration of live well water allows fish to remain healthy and thus able to be safely returned to their marine environment. As fishing proceeds, more fish may be caught and a maximum proscribed limit (in weight or number of fish) may be approached. It may then be desirable to release the earlier (and possibly smaller) catch so as to allow the legal retention of the better fish.

Although culling is a very effective way of increasing the quality of a fisherman's daily catch, it does require equipment which has, up until the present, not been amenable to portable use. Most culling equipment consists of live wells built into fishing boats. Relatively heavy culling units, meant to be carried on board and installed as removable devices on boats have also been designed. However, to date, no light weight, easily transportable culling units have been disclosed.

Since culling equipment has heretofore not been designed for portable use, such devices have depended upon on board power supplies for the powering of circulation pumps and/or aerators which provide the required aeration of live tank water. Since external power is usually freely available onboard even the smallest fishing vessels, aeration/circulation systems have not been built so as to maximize energy efficiency. Such vessels may provide, for example, a lead/acid marine battery for accessory use and may additionally include, in the case of powered boats, a marine alternator which provides power for culling as well as recharging of onboard batteries. Obviously, marine boat batteries and/or alternators do not provide the portability required in a truly transportable culling system which is intended to be operated outside of a boat.

On board live wells found in fishing boats may be easily filled with water directly from the environment from which the fish are taken. Because the free boards of most smaller boats, and the swim platforms of larger boats make access to ocean, lake or rive water very convenient, on board live wells often utilize removable tanks which may be filled directly by lowering them into the water surrounding the boat, or by utilizing containers to carry the water the short distance between the well and the water's surface. However, fisherman who fish from a dock or wharf may be separated from the water in which they fish by many feet. This makes the task of filling live wells difficult at best and, in some cases, dangerous.

Presently available live wells are not, as discussed above, designed to be freely transportable beyond placement within a boat or, in some cases, in a permanent dockside location. Thus, until present, culling technology has included no provision for easy portability, independence from outside power sources, and a means for obtaining marine water when the live tank utilized therein is not proximate to the surface of the aquatic environment. What is needed is a truly transportable culling system providing aeration and/or circulation of live well water without the need of outside power sources and enabling fisherman a means for easily obtaining marine water therefore.

In addition to providing a suitable location for culling stations, boats have also provided fisherman with convenient storage for bait, beverages, fishing gear and other personal items a fisherman might require during a day (or night's) outing. Even smaller water craft provide enough space to carry simple coolers, tackle boxes, bait wells and other recreational equipment. Since both boat and fisherman travel from site to site together, the boat itself provides ready transportation of what is needed for a successful and convenient outing. However, the dockside or shore fisherman must, by necessity, carry all of the tackle, gear, bait, beverages, food and other items he requires for the day with him. This often requires such sportsmen to carry a cooler, tackle box and bait carton in addition to his rod and reel. It would be highly advantageous if a device were disclosed which provided storage and easy transportation of a fisherman's tackle, gear, bait, food, beverages and other personal items. It would be further desirable if such a device were disclosed which also included a live well wherein aeration and/or circulation of water were provided for the culling of catch.

Many fisherman equip their boats with rod holders which allow them to affix their rod to their boat instead of constantly holding on to their equipment during long periods of inactivity. However, for the dockside, shore or wharf fisherman, such rod holders have heretofore not been available. It would be highly desirable if a portable rod holder were disclosed wherein dockside, shore and wharf fisherman were provided with a means for securing their fishing rod. It would be still further desirable, if a device were disclosed which provided storage and easy transportation of a fisherman's tackle, gear, bait, food beverages and other personal gear, while also providing a rod holder. It would be most desirable if a device were disclosed providing easy transportation of a fisherman's gear, tackle, bait, food, beverages and other personal gear, while also providing a live well wherein aeration and/or circulation of water were provided for the culling of catch, while, in addition, providing a fishing rod holder.

SUMMARY OF THE INVENTION

Now, in accordance with the present invention, a portable culling cart is disclosed. The portable culling cart of the present invention is comprised of a housing, a live well therewithin, a powered means of filling the live well with water from a marine source, a water circulation/aeration means, a self-contained power source for powering the circulation/aeration means as well as powered means of filling the live well, and at least two wheels for transportation of the cart. The term "powered means" as utilized herein and throughout the specification and claims refers to an electrically powered means powered by onboard electric cells. Thus the portable culling cart of the present invention provides for powered aeration, circulation and self-filling of the live well without need for external power supplies or manual filling. The term "self-contained as utilized throughout this specification and in the claims refers to means, devices, and sources which are contained within the disclosed cart and which do not require the use of any part or portion thereof not provided by, mounted or contained within the disclosed cart.

In a first preferred embodiment of the present invention, the culling cart housing is comprised of a top panel, a bottom panel, a left outer panel, a left inner panel, a right outer panel, a right inner panel, a front panel and a back panel. In certain preferred embodiments of the present invention, a lower portion of the front and back panel, adjacent to the right panel or left panels, includes a recessed portion forming a wheel well (as described in greater detail below) provided for the mounting and location of a pair of wheels. The top panel of the cart provides for opening and/or complete removal from the cart so as to provide access to a live well thereunder. The top panel may, for example, be advantageously attached to an upper portion of the front or back panel via a hinge means so as to allow the top panel to open upward so as to expose a live well located within the cart as discussed below.

In certain preferred embodiments of the present invention, the live well is boarded by and defined by inner surfaces of the bottom, left (inner), right, front and rear panels of the cart housing, These panels are affixed to each other via water tight seals such as, for example, welds so as to allow secure water containment.

The cart housing may be formed of aluminum, stainless steel, or a plastic material such as, for example, polyvinyl, polyacrylate, silicon or any other suitable material. However, regardless of the material utilized for the housing, each of the afore-mentioned panels must be affixed to the panel's adjacent to it via water tight seals except, of course, for the top panel.

In the first preferred embodiment of the present invention, the cart housing includes and defines a space formed by the left outer, left inner, front, back and bottom panel. However, in other preferred embodiments of the present invention, the configuration of the cart may be reversed so that this space is formed by the right outer, right inner, front, back and bottom panel. In either case, this space described immediately above is referred to as a utility compartment and provides a convenient compartment for the housing and positioning of means for filling the live well with water, circulation/aeration means and self-contained power source(s) discussed below. The panels defining the utility compartment are joined by water tight seals—such as welds or plastic bonding—. In certain alternate embodiments of the present invention, at least a portion of the utility compartment—containing a dedicated circulation/aeration pump—is in fluid communication with the live well. In such configurations, the dedicated circulation/aeration pump is of a submersible design and is activated only when the water level within the dry well—and associated water level within that portion of the utility compartment in which the dedicated pump is located—has risen to the point wherein it has reached an impeller in the base of the submersible pump. In such alternate embodiments, a separate dual port pump is utilized for filling of the live well with water.

In the first preferred embodiment of the present invention, the utility compartment includes fluid communication with the live well via at least one water inlet port located adjacent an upper portion of the inner left or right panel. In addition, a water outlet port is located adjacent a lower portion of the inner panel. In addition, it is most advantageous to include a water outlet conduit located along the inner aspect of the bottom housing panel. The water outlet conduit is comprised of a top, front, rear and end plate and defines a conduit leading towards the intake port of the left inner panel (or in alternate embodiment the right inner panel. A portion of the inner wall of the bottom panel effectively forms a bottom plate of the water inlet conduit. Each of the plates comprising the inlet conduit are affixed to each other, via a water tight seal—such as a weld or bond—so as to allow the conduit to effectively operate as a means of gathering and channeling water collected from the live well to and through the water outlet port. The outlet conduit—which, other than its communication with the outlet conduit, is water tight and includes a plurality of perforations through the top wall thereof so as to allow the flow of water, contained within the live well, to move from the live well, through the conduit and into the water outlet port.

The utility compartment of the first preferred embodiment of the present invention includes at least one means of circulating and aerating water within the live well such as, for example, a water pump. In the first preferred embodiment of the present invention, dual port pumps are utilized wherein a connection from the water outlet of the live well to the input of the pump(s) is provided via tubing, fittings and a water valve, as described in more detail, below. In addition to the at least one water pump, it is contemplated that certain embodiments of the present invention include an air pump, mounted within the utility compartment and configured to deliver air to water held within the live well via, for example, a connection to the water outlet conduit. However, the first preferred embodiment of the present invention utilizes a spray head attached, for example, to the live well water inlet to provide required aeration. Alternative embodiments of the present invention may also utilize aerators mounted at the bottom of the live well (on the inner aspect of that portion of the bottom panel forming the lower wall of the well) in order to provide supplemental aeration to the water. Such devices utilize a snorkel-shaped spray head to spray multiple streams of water, delivered via the head from a water pump mounted on the well floors below. As the water is sprayed from the head, it mixes with air resident above the live well and thus further oxygenates the well.

Water pumps such as the Rule Model 202, manufactured by Rule Industries, Cape Ann Industrial Park, Gloucester, MA operate at 12 volts at about 2.1 amps and are most suitable for use with the present invention. Such pumps advantageously include a pump inlet and a pump outlet. In the first preferred embodiment, the pump is mounted and positioned, within the utility compartment, so that the pump outlet is aligned with and communicates with the water inlet port of the inner left or right panel —depending on the configuration of the cart as discussed above—.Thus, the water outlet of the pump is connected, via suitable connectors and/or a length of tubing to make a water tight seal with the water inlet port of the inner panel. The pump inlet is connected, via tubing and/or other suitable fluid tight connectors, to a water selector valve located within the utility compartment having a dial selector mounted on the front panel of the cart forming a wall of and abutting the utility compartment. The selector valve is, in turn, is connected to 1. a length of water pick-up hose utilized for obtaining water for the live well directly from the marine environment; and 2. a short length of tubing and/or other water tight connectors which serve to connect the valve to the live well water outlet port located near the lower portion of the left (or right) inner panel which, in turn, is in fluid communication with the water outlet conduit.

Water supply pumps such as, for example, Jabsco's electric flexible impeller pump "Water Supply Puppy (SR 12V)" manufactured by Jabsco, Bingley Road Hoddesdon, Hertfordshire, EN11 0BU UK are suitable for use with the present invention. However, less expensive dual port pumps are available and are quite adequate in providing both required water pick-up and circulation. For example, Rule's Models 200 FCDP (1.9 amps/12 volts), 201FCDP (2.1 amps/12 volts), 203FCDP (2.8 amps/12 volts) and 205FCDP (3.5 amps/12 volts) providing 300, 500, 700 and 1100 GpH output, respectively manufactured by Rule Industries, Cape Ann Industrial Park, Gloucester, Mass. 01930 provide more than adequate water flow and aeration.

It is preferable for the culling devices of the present invention to include a drain positioned and mounted proximate to and through a lower portion of the front (or rear panel depending on configuration), near the union of these panels with the bottom panel. Location of a drain in this position assures the most complete draining of the well (other than mounting in the bottom panel which would present access difficulties). The drain may be of any of the usual designs such as, for example, a simple screw plug or friction plug design as utilized on boat bilges, push bottom spring retained valve, or a screw/washer valve.

In the first preferred embodiment of the present invention, an opening is provided, within a portion of the front panel abutting the utility compartment so as to allow easy access to the water pick-up hose. A utility panel top cover allows access to what may be described as the pump house wherein the pump(s), batteries utilized by the device are housed. The utility compartment includes at least one battery selected to provide suitable voltage and amperage service so as to power the aforementioned pumps. It has been found that, for the majority of pumps utilized in the cart of the present invention, dry cell batteries providing from about 6 to about 12 volts of power are suitable. For example, 6 volt alkaline batteries such as Energizer model EV528 or EV529 providing 6 volts and having a capacity of 26,000 mAh manufactured by the Eveready Battery Company, Inc. of 10 Leighton Road Milford, Conn. 06460 and Duracell, model MN08 6 volt alkaline battery manufactured by The Gillette Company, Prudential Tower Building, Boston, Mass. 02199 are suitable power sources for use with the pumps. These batteries may, of course, be linked in series so as to provide up to 12 volts of power for those pumps requiring such power. However, it is also contemplated that rechargeable batteries such as, for example, the Sonnenschein model A500 5 ampere hour rechargeable batteries (available through Lauderdale Battery & Alternator, 2415 SW 3rd Ave, Ft Lauderdale Fla. 33315) be utilized with the present invention due to the relative economy provided in selecting a rechargeable battery. These batteries may also be connected in series to provide 12 volts of power.

As discussed above, for the purpose of mounting the battery, and in order to provide further support for the at least one water pump, the utility compartment includes a pump house located at an upper portion thereof divided from the remainder of the utility compartment by means of a pump shelf. The pump shelf serves to support the pump(s) and battery(ies). The pump shelf is supported by fixation to a portion of the front, back left inner and left outer panel. Of course, in those embodiments of the present invention wherein the cart is configured so as to include the utility compartment on the right side of the unit, the shelf is affixed to the right inner and right outer cart panels. That portion of the top panel which covers the pump shelf is advantageously configured as an independent removable or hinged section of the top panel so as to enable independent access to the batteries and pumps without having to uncover the live well and risk exposure of the battery(ies) to the water therein which may, in fact, be highly corrosive salt water. In certain alternate preferred embodiments of the present invention, a dedicated circulation pump, of a submersible (or sump) design is mounted in the pump house. In such embodiments, that portion of the pump house in which said dedicated pump is mounted is in fluid communication with the live well. Thus, upon filling of the live well via a separate live well filling pump, water eventually fills that portion of the pump housing in which the dedicated circulation pump is located. Upon rising to a level sufficient to fill the impeller area of the circulation pump, the pump may be activated in order to circulate water. However, it is highly advantageous in such embodiments to utilize a dedicated circulation pump having an integral float switch (or separate float switch) so as to provide automatic activation when the water level has risen to a sufficient level as described above.

As discussed above, in the first preferred embodiment of the present invention, the water selector valve is configured so as to enable, in one valve position, connection of a tube leading from the pump intake port to the water intake hose, The water outlet port of the pump, as also discussed above, is in fluid communication with the live well. As discussed above, in some preferred embodiments, the live well intake port will include a spray head to further aerate water as it enters the well. When the cart of the first preferred embodiment is utilized for culling purposes, the live well therewithin must first be filled with suitable marine water. For this purpose, an inlet end of the water intake hose is initially removed from the utility compartment where it is stored and lowered into a marine water source. Thereafter, activation of a dual port pump (via a simple switch)—when the water selector valve is positioned so as to place the pump intake in fluid communication (via the valve) with the intake hose, causes the pump to draw water from a marine source (such as, for example, a lake, ocean or river). The pump draws the water from such a source and thereafter pumps the water into the live well via the inlet port. It is important to note that the live well is filled to a level below that of the well intake port so as to enable aeration of water when the live well water is circulated (as discussed below) If a fisherman is fishing from a dock above the water, he may lower the intake hose down to the surface of the water, activate the pump, and fill the live well with suitable culling water. After the live well has been filled with a sufficient amount of water to provide the necessary volume for culling—but below the well inlet port-, the selector valve is placed in an "Off" position wherein fluid connection between the pump, intake hose, and well outlet are effectively sealed. As discussed below, in the first preferred embodiment of the present invention, the "Off" setting of the water selector valve also interrupts electric power flowing to the pump(s) via an integrated electrical switch. In other embodiments, power to the pump(s) is cut via an independent electric switch or may be interrupted via a simple float switch located within the live well or a portion of the utility compartment in fluid communication with the well. In instances where a float switch is utilized to interrupt power filling of the live well, the float is positioned so as to prevent the water level from reaching the live well inlet port.

In the first embodiment, when the selector valve is positioned so as to connect a tube leading to the pump(s) inlet to the tube attached to the live well outlet port, water within the live well is drawn through perforations in the outlet conduit, and thence through the outlet conduit, outlet port, tube, valve and pump(s) inlet port. The water is then expelled through the pump outlet port through the live well water inlet port located near the upper edge of the live well. The water ejected through the live well water intake port is projected over the air overlying the live well and thus becomes aerated. In addition, in those embodiments of the present invention wherein the live well intake port includes a spay head, fine streams of water increase the surface area of aeration of the stream so as to increase oxygenation of the water. Thus, when the selector valve connects the output of the pump to the intake port of the well, water enters the well from above, begins to circulate through the well, tubing and pump. The movement of the water through the system, in combination with the aforementioned mixture of the projected inlet water with a layer of air resident on the surface of the live well, provides for sufficient aeration of the water so as to support fish that may be held therein.

Activation of the pump may be, as discussed above, controlled by a simple switch such as a SP/ST switch mounted in the front panel near the water selector valve. However, in the first preferred embodiment of the present invention, it is advantageous to provide a dual function switch wherein the water selector valve includes a control knob with detents labeled "INTAKE", "CIRCULATE" and "OFF". Such a switch, when placed in the "OFF" position interrupts and seals the connection of the tube leading to the pump intake to any other tube or hose. In this position, the switch preferably includes an electrical switch function of interrupting an electrical circuit providing power from the battery(ies) to the pump(s). However, when the control knob is rotated to either the "INTAKE" or "CIRCULATE" positions, integrated electrical contacts complete a battery to pump circuit powering the pump and allowing the pump to either "INTAKE" (draw water from a source) or "CIRCULATE" aerate the live well by circulating water.

The culling device of the present invention includes at least two wheels so as to provide for and allow simple transportation of the unit without the need for heavy lifting. In a preferred embodiment of the present invention a pair of wheels are provided and mounted to the device adjacent the left or right housing panel proximate to a bottom portion thereof. In those embodiments of the present invention incorporating a pair of wheels mounted proximate the bottom right panel, the device includes a transportation handle located adjacent the left panel of the cart for raising the device upon its wheel for movement thereof. On the other hand, if the device incorporates a pair of wheels mounted proximate the bottom left panel, then the device will include a transportation handle mounted on the right panel for that same purpose. It is preferred, as disclosed in more detail below, that the transportation handle be configured so as to articulate at least two sections as so extend away from the cart and unit wheels and lock in that position during use. More specifically, during transportation of the cart, the extension of the transportation handle away from the care increases the leverage provided thereby in lifting the unit and shifting the weight back towards the wheels. In any event, movement of the device is similar to movement of a wheel barrel wherein the weight of the unit is shifted to the wheels via a handle located at the opposite end in relation to the wheels. For this reason, and, as discussed below, it is preferred to configure the cart so that the wheels are located on that side of the cart opposite the utility compartment. The first preferred embodiment of the present invention discloses a culling cart which is configured to include drawers. It is preferred that the wheels be located on the opposite side of the unit relative to the drawers and utility compartment. In each case, the weight of water within the cart is shifted towards the wheels rather than the transportation handle so as to assist the user in raising the unit upon the wheels and rolling the cart.

In preferred embodiments of the present invention, the cart is configured to include recessed portions of the front and back panels,—wheel wells—.These wheel wells are formed by a portion of the bottom and side panels of the cart and are provided for location and operation of the cart wheels. Adjustable wheel mounting levers are pivotally mounted—at distal ends thereof—to a portion of the front and back cart housing panels at a point within the wheel wells adjacent to the bottom of the cart. The wheel levers, at proximal termini thereof are joined to each other with a cross bar which serves, as discussed below as a height adjustment handle. Wheels are rotatably mounted upon each lever via a simple axle which, in turn, is located between the distal termini of the levers and the locking bore discussed below. Proximal to the wheels mounted upon the wheel levers, a lever locking bore, passing through the lever, is especially positioned and configured so as to align with a plurality of height adjustment bores prepared within a portion of the front and back panels. Preferably, the height adjustment bores are located within the recessed portion of the front and back panels and generally define—when viewed together—an arch having a radial center located at the pivotal axis of the wheel mounting lever. As discussed above, each of the wheel mounting levers is pivotally mounted to the cart, within a lower portion of the wheel well. Pivoting the levers downward, by means of depressing the height adjustment handle, tends to lower the wheels position in regard to the cart and, in turn, raises the entire cart off of a surface upon which it is positioned. Depending on terrain, a suitable distance between the bottom of the cart and the terrain may be selected by pivoting the levers via the handle. Upon attaining a desired height, an engagement means such as, for example, a simple pin or spring loaded bushing may be utilized to engage both the height engagement means such as, for example, a simple pin or spring loaded bushing may be utilized to fix the lever handles at a selected height by simply utilizing the wheel lever handle to raise or lower the wheels to a selected height. Thereafter, the position of the wheel lever handle may be "locked in" by means of placing a simple pin through the lever locking bore and a height adjustment bore most closing aligned therewith at the selected lever position.

A cart transportation handle, mounted to the side panel of the cart opposite the wheels is provided so as to allow the unit to be raised, in a manner very similar to that of a wheel barrel, upward, thereby transferring a majority of the cart's weight to the afore-mentioned wheels. The transportation handle may be located adjacent the left panel for raising the device upon its wheel for movement thereof. On the other hand, if the device incorporates a pair of wheels mounted proximate the bottom left panel, then the device will include a transportation handle mounted on the right panel for that same purpose. It is preferred, as disclosed in more detail below, that the transportation handle be configured so as to extend away from the cart and unit wheels during use so as to increase the leverage provided thereby in lifting the unit and shifting the weight back towards the handles. Utilizing such a handle, the cart may be wheeled to a desired location. As mentioned above, depending upon the surface upon which the cart is located, the wheel lever positions are adjusted so as to provide ease of transportation. More specifically, when the cart is to be rolled over soft terrain—such as sand or mud—wherein the wheels may sink to a certain degree, it is highly advantageous to pivot the levers downwards, by means of the height adjustment handle, so as to extend the wheels mounted upon the levers to their lowest position. Such a position allows greater clearance between the bottom of the cart and the terrain when the wheels sink into the ground. On firm terrain, such as pavement or boardwalks, the wheel levers may be pivoted towards an upper position so as to increase the ease of raising the unit with the transportation handle. In order to assist a user in lowering the wheels of the cart, a height assistance handle, located above the height adjustment handle, may be utilized to raise the cart prior to lowering the wheels. Of course it is preferable to adjust the height of the cart prior to filling the live well with water.

In addition to the above-described embodiment, the preferred embodiment of the present invention provides all of the above functions and features of the disclosed portable culling cart and, in addition, provides a plurality of drawers and compartments for the storage of fishing gear, tackle, bait, beverages and food. One or more of the drawers may be insulated so as to act as a cooler—or warmer—for food and beverages. Preferably, the aforementioned drawers are accessed via a portion of the front panel of the housing and are located proximate an end panel (right or left panel) of the unit which does not include the device wheel well or associated mechanism. When the live well of the device is filled with water, the weight of the unit naturally increases. It is preferable that the center of mass of the water is located as proximate to the wheels as possible so as to increased weight of the unit produced thereby is located closer to the axis of the wheels for superior weight handling.

DETAILED DESCRIPTION

Figure 1:
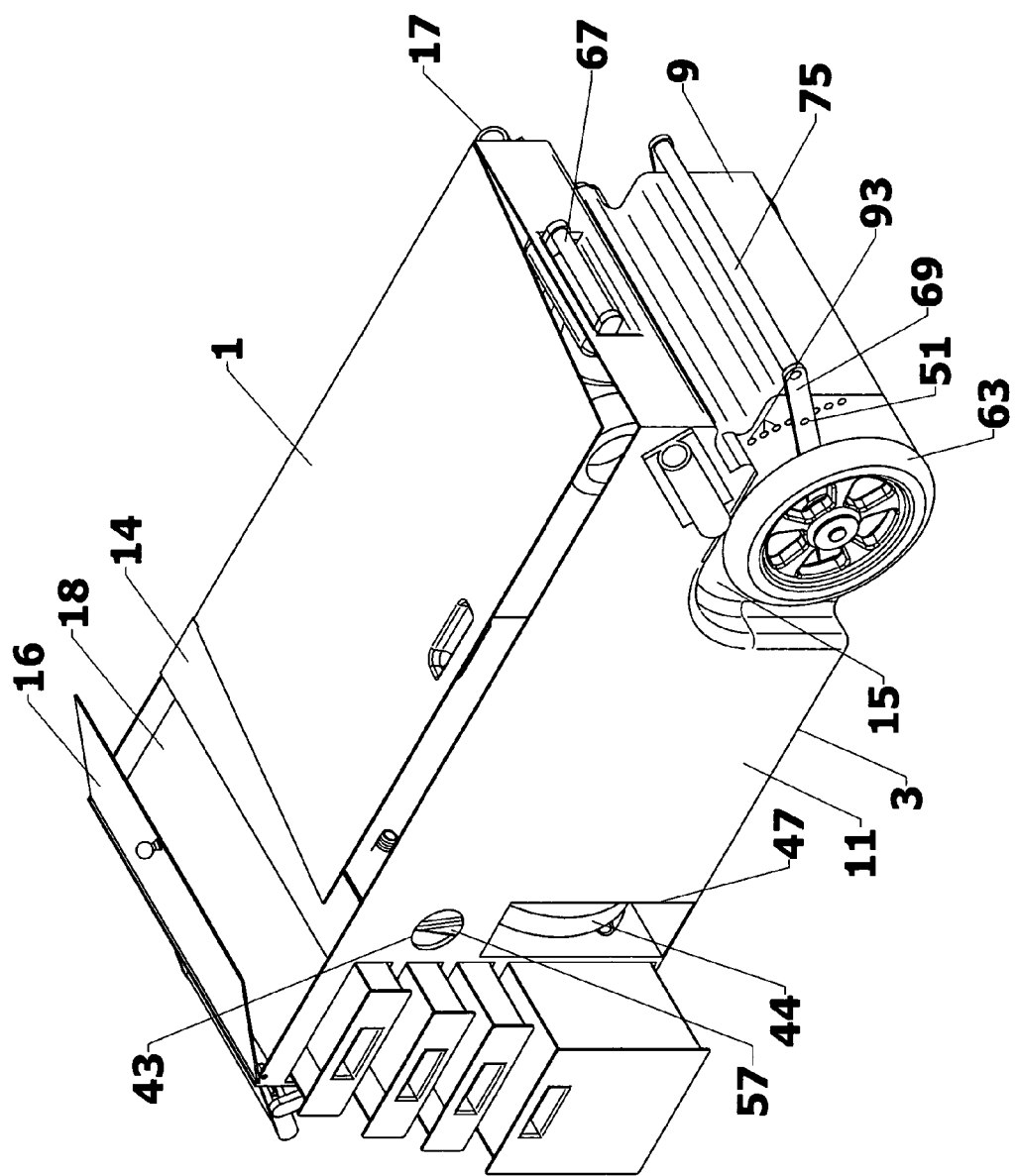
FIG. 1 is a right isometric view of a preferred embodiment of the present invention.
Figure 2:
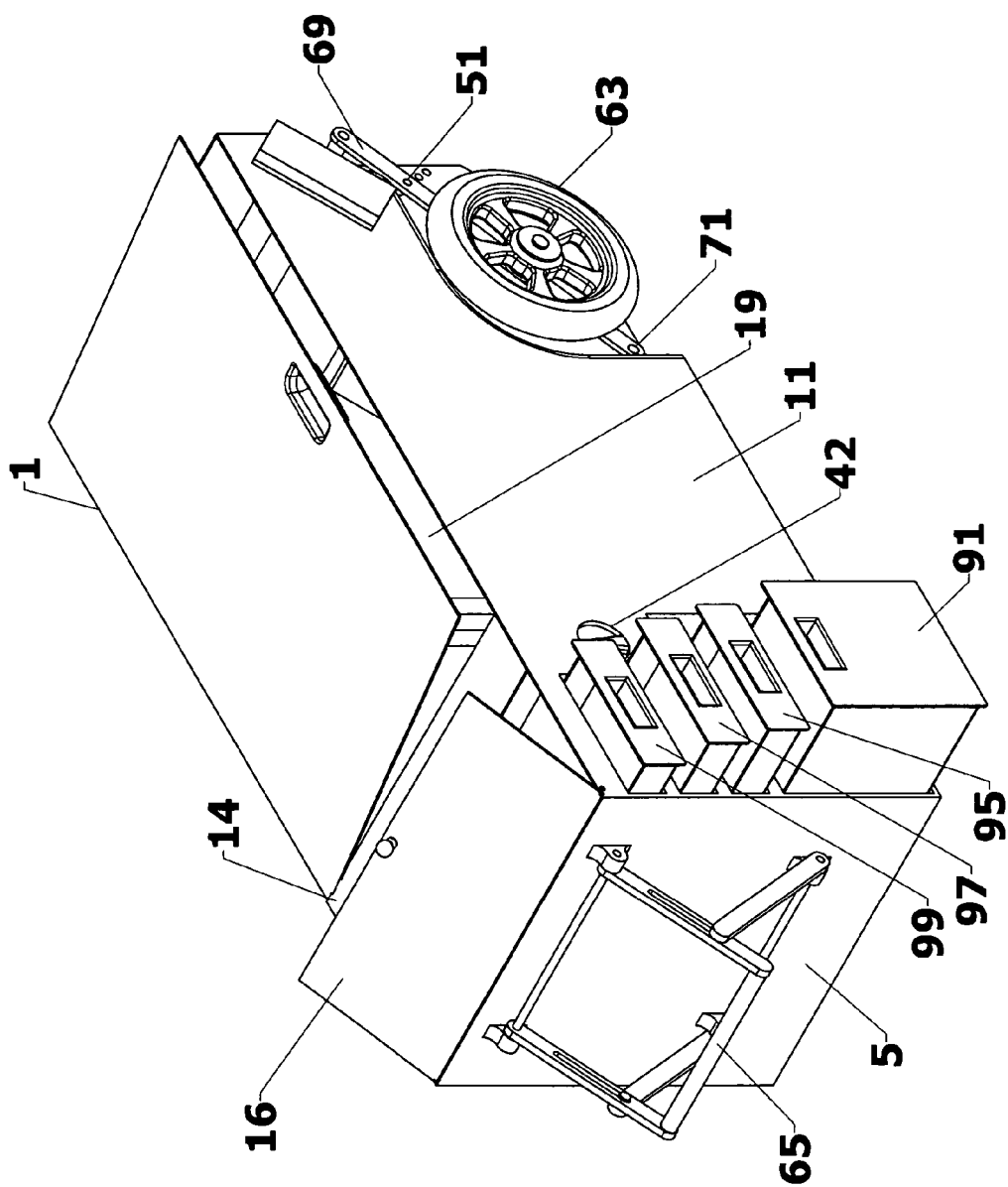
FIG. 2 is a left isometric view of the preferred embodiment shown in FIG. 1.

A first preferred embodiment of the present invention is illustrated in FIGS. 1-5. The cart housing is comprised of a top panel 1, a bottom panel 3, an outer side panel (left) 5, an inner side panel (left) 7, a right panel 9, a front panel 11 and a back panel 13. In the preferred embodiment of the present invention illustrated in the figures, an additional storage section divider panel 12 is provided in order to separate the below described utility compartment from storage drawers and trays (also described below).

A lower portion of the front and back panel, adjacent to the side panel (right), as well as a portion of the side and bottom panel, is advantageously configured in the shape of a wheel well 15 and 15' (as described in greater detail below) provided for the mounting and location of a pair of wheels. A portion of the top panel 1 of the cart is removable therefrom and may, for example, be advantageously attached to the cart via a hinge means 17 so as to allow itl to open upward, via said hinge means, thereby exposing a live well 19 located within the cart as discussed below. A removable pump house cover 14 is provided to both protect and provide access to the pump house. In addition, the top of the cart includes a hinged tray cover which provides access to the storage tray 18 below.

In the first preferred embodiment of the present invention illustrated in the figures, a live well is boarded by and defined by inner surfaces of the bottom, left (inner), right, front and rear panels of the cart housing, These panels are affixed to each other via water tight seals such as, for example, welds so as to allow secure water containment.

The cart housing may be formed of aluminum, stainless steel, or a plastic material such as, for example, polyvinyl, polyacrylate, silicon or any other suitable material. However, regardless of the material utilized for the housing, each of the afore-mentioned panels must be affixed to the panel's adjacent to it via water tight seals except, of course, for the top panel. Also, it is preferred to fabricate the housing from materials resistant to salt water corrosion such as described above.

In the first preferred embodiment of the present invention illustrated in the figures, the cart housing includes and defines a space formed by the storage compartment divider panel 12, left inner 7, front 11, back 13 and bottom 3 panel. This space is referred to herein as the utility compartment 21 and provides a convenient compartment for the housing and positioning of the means for filling the live well with water, circulation/aeration means and self-contained power sources discussed below. The upper portion of the utility compartment is separated from a pump house 22 in which the cart battery(ies) and pump(s) are contained. In alternate preferred embodiments of the present invention, a portion of the pump house containing a dedicated submersible type circulation pump is in fluid connection with the live well. This section of the pump house is water tight in regard to the remainder of the pump house and utility compartment. In such configurations, a separate dual port pump is utilized to fill the live well (as described above and below), until the live well is filled with enough water to reach the level of the sump pump impeller. Once sufficient water is received in the well so that the water level has reached the level of the sump pump impeller, an automatic float switch or manual switch may be utilized to circulate water. More specifically, when powered by electric current derived from the one or more batteries, the impeller pushes water through the sump pump and out the pump outlet which is connected (directly or via tubing) to the live well inlet. The live well water in let is located above the water level as controlled manually or by an additional float switch. In any event, water is circulated back into the dry well via a pumped stream projecting through an air space over the water level. Thus, aeration and circulation are provided in the alternate preferred embodiment via the action of the dedicated circulation pump.

In the first preferred embodiment of the present invention, the inner panel separating the utility compartment 21 from the live well includes two water inlet ports 23 and 23' located adjacent an upper portion of the inner left panel 7 so as to provide a path for entry of water into the live well. In addition, at least one water outlet port 25 is located adjacent a lower portion of the inner panel providing a path for water to exit the well through the lower portion of the inner panel. In addition, it is most advantageous to include a water outlet conduit 27 located along the inner aspect of the lower housing panel. The outlet conduit is comprised of a top 29, front 31, rear 33 and end wall 35 defining a conduit leading towards the water outlet port 25 of the left inner panel. In addition, the conduit is formed by a portion of the inner wall of the bottom panel which effectively forms a bottom wall of the water outlet conduit. Each of the panels comprising the outlet conduit are affixed to each other, via a water tight seal, so as to allow the conduit to effectively operate as a means of gathering and channeling water collected from the live well to and through the water outlet port. The outlet conduit —which, other than its communication with the outlet conduit is sealed—includes a plurality of perforations 28 through the top wall thereof so as to allow the flow of water, contained within the live well, to move from the live well, through the conduit and through the water outlet port.

The utility compartment of the first preferred embodiment of the present invention includes at least one means of circulating and aerating water within the live well such as, for example, a water pump(s) 37 and 39. Each water pump advantageously includes a pump inlet 41, 41' and a pump outlet 43 and 43'. In the preferred embodiment of the present invention illustrated in FIGS. 1-5, the pumps are dual port pumps and are mounted and positioned, within the utility compartment, so that the pump outlets 43 and 43' are aligned with and communicate with the water inlet ports of the inner left panel. In fact, the pump outlets, in some configurations, may actually comprise the live well water inlet. The water inlet of the pumps may be connected, for example, via suitable tubing, a tube connector such as, for example, a "T" connector, and an additional length of tubing to a water flow selector valve 42 housed within the utility compartment and mounted upon a portion of the front panel of the cart forming a wall of and abutting the utility compartment. The selector valve in turn, provides fluid connection, in one position to 1. a length of pick-up hose 44 utilized for obtaining water for the well directly from the marine environment (and thus of sufficient length of from about 10 to about 25 feet); and 2. in a second position to a short length of tubing which connects the valve to the water outlet port of the live well 25 (which, in turn, is in fluid communication with the water outlet conduit and live well.

It is preferable for the culling devices of the present invention to include a drain 45 mounted to a lower portion of the front (or rear panel), near the union of these panels with the bottom panel. Location of a drain in this ,position assures the most complete draining of the well (other than mounting in the hard to access bottom panel). The drain may be of any of the usual designs such as, for example, a simple screw plug design as utilized on boat bilges, push bottom spring retained valve, or a screw valve.

In the first preferred embodiment of the present invention, an access opening 47 is provided, within a portion of the front panel abutting the utility compartment so as to allow easy access to the water pick-up hose. The pumps, batteries and other constituents of the utility compartment are housed within an upper portion of the utility compartment referred to as the pump house. The pump house may be accessed via the pump house cover 14. The utility compartment also includes at least one battery and, preferably two batteries (49 and 51) providing suitable voltage and amperage service so as to power the aforementioned pump. For the purpose of mounting the battery, and in order to provide further support for the at least one water pump, the utility compartment may be provided, at an upper portion thereof, with a utility shelf 53 to support said pump and battery. The utility shelf effectively segregates an upper portion of the utility compartment so as to define a pump house As discussed above, the water selector valve 42 is configured so that, in a first position, (enabled by turning a selector switch 57) it fluidly connects tubes leading to pump intake ports and the water pick-up hose utilized for obtaining water for the live well. The water outlet port of the pump, as also discussed above, is in fluid communication with the live well via the live well inlet ports. In some embodiments of the present invention, the live well water inlet(s) may also be fitted with a spray head so as to enhance water aeration.

When the cart of the first preferred embodiment illustrated in the figures is utilized for culling purposes, the live well therewithin must first be filled with suitable marine water. However, the live well must be filled to a level below the live well inlet ports 23 and 23' so, as discussed above, to aid in proper aeration. Filling the live well above the level of the inlet port(s) would prevent water pumped into the well from first mixing with air resident over the water therein. An inlet end of the water pick-up hose 44 is initially removed from the utility compartment and lowered into a marine water source. Thereafter, activation of the dual port pump (via a simple switch)—or via an electrical contact made and circuit completed when the water selector valve is positioned to make the fluid connection between the pump inlet and pick-up hose— causes the pump to draw water from a marine source (such as, for example, a lake, ocean or river). More specifically, the pump draws the water from such a source through the pick-up hose, through the selector valve, through the pump inlet, out the pump outlet and into the live well via the live well inlet port. Thus, if a fisherman is fishing from a dock above the water, he may lower the intake hose down to the surface of the water, activate the pump, and fill the live well with suitable culling water in which the subject fish live.

When the selector valve is placed into a second position, it connects (places in fluid connection) the tube leading to the pump(s) inlet to the tube attached to the outlet port of the live well (located near the lower portion of the left inner panel). Activation of the pump(s) when the selector valve is in the second position causes water, already within the live well, to be drawn through perforations 28 in the outlet conduit, and thence through the conduit, live well outlet port, selector switch and inlet of the pump(s). The pump(s) then propels the water through the live well intake port, over and finally into the live well after aeration. The result is that water within the live well, when the water selector valve is in the second position and the pump(s) is activated, circulate. As discussed above, air, resident above the water level of the live well, may thereby be effectively utilized to aerate the live well. However, it is also contemplated that a separate aerator may be utilized in order to draw water from the bottom of the live well, and thereafter spray the water, via an air head, through the air resident above the well. Although certain preferred embodiments may utilize such separate aerators, it is preferred that additional aeration, if required be provided via aeration heads affixed to the live well intake ports. Such heads, which include a plurality of fine spray openings, cause the water pumped and circulated into the well by the water pumps, to form a spray over the well before entering the water. Such spaying of the water effectively helps increase aeration without the need for a separate mechanism. However, in those instances where a separate air pump is utilized in addition to a water pump, it is preferable that the air pump be provided with a separate electrical switch and circuit so as to enable the air pump to operate independently of the water circulation pump.

Activation of the water pump(s) may be, as discussed above, controlled by a simple switch such as a SP/ST switch mounted in the front panel near the water selector valve. However, it is advantageous to provide a dual function switch wherein the water selector valve includes a control knob with detents labeled "INTAKE", "CIRCULATE" and "OFF". Such a switch, when placed in the "OFF" position seals off the connection of the tube leading to the pump intake to any other tube or hose. In this position, the switch may also provide an electrical function—interrupting an electrical circuit connecting the pump(s) to a battery(ies)—.However, when the control knob is rotated to either the "INTAKE" or "CIRCU- LATE" positions, integrated electrical contacts within the switch complete a battery to pump circuit powering the pump and allowing the pump to either "INTAKE" (draw water from a source) or "CIRCULATE" aerate the live well by circulating water.

Figure 3:
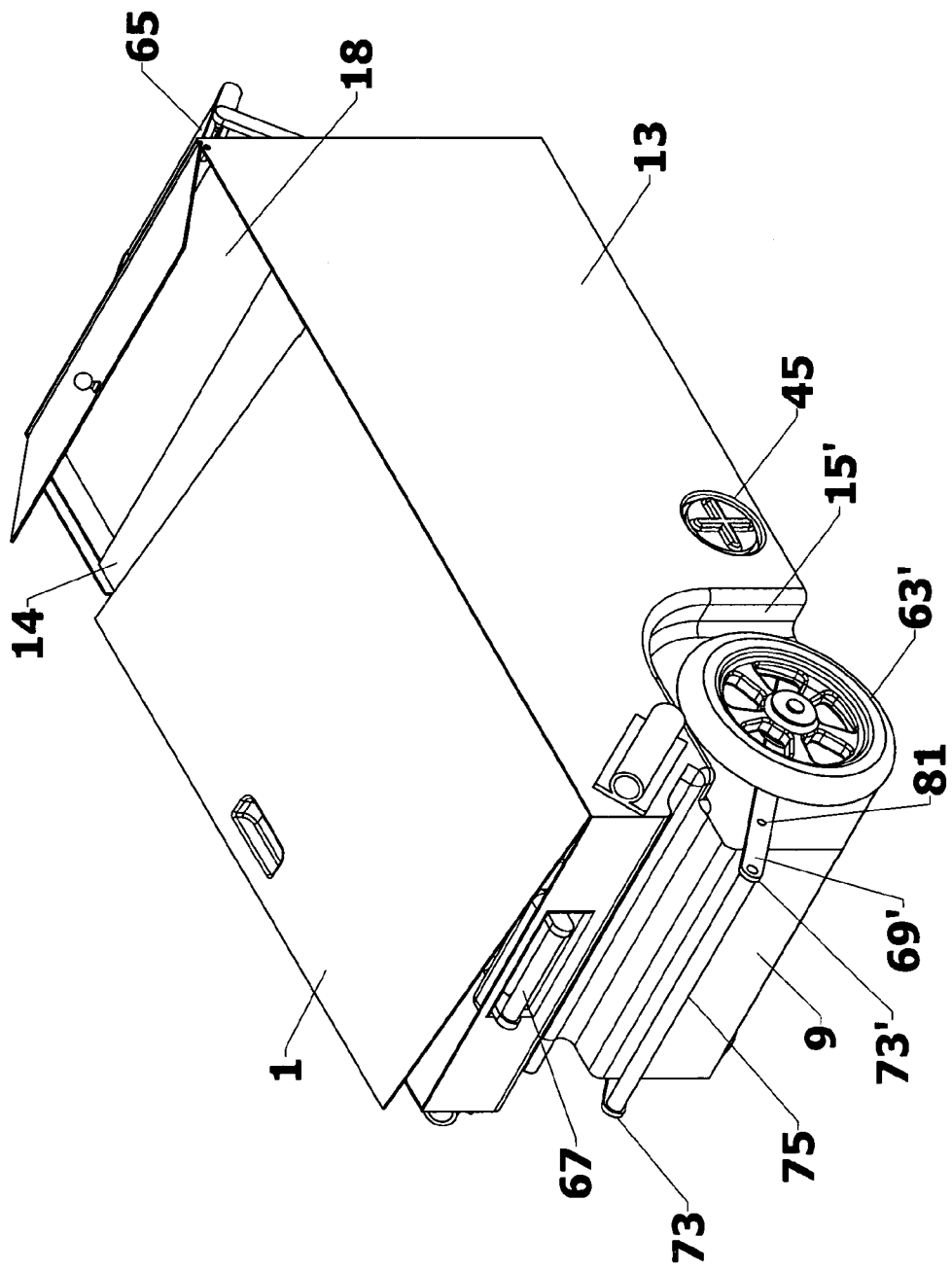
FIG. 3 is rear isometric view of the preferred embodiment shown in FIGS. 1 and 2.
Figure 4:
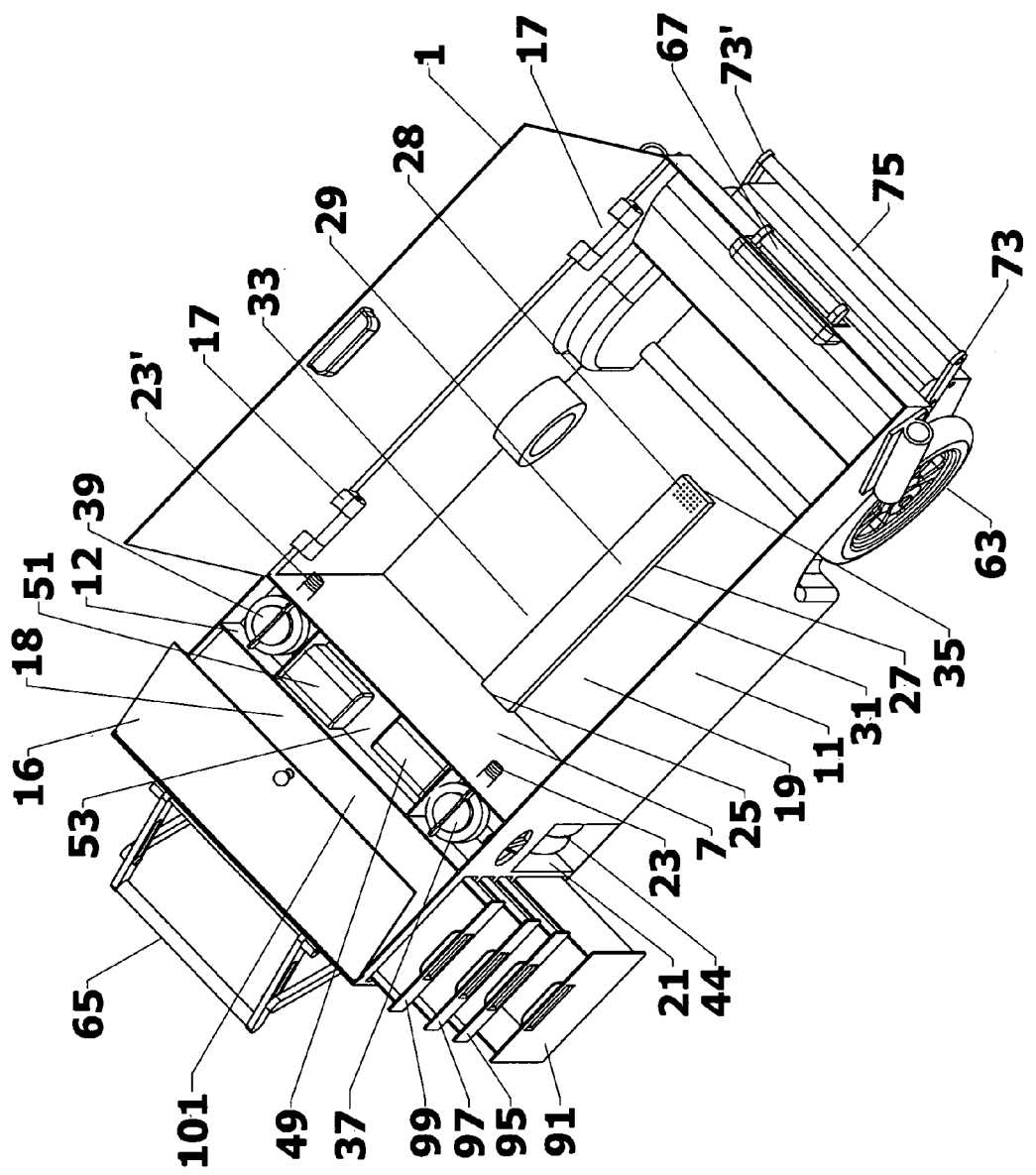
FIG. 4 is a top view of the preferred embodiment shown in FIGS. 1, 2 and 3.
Figure 5:
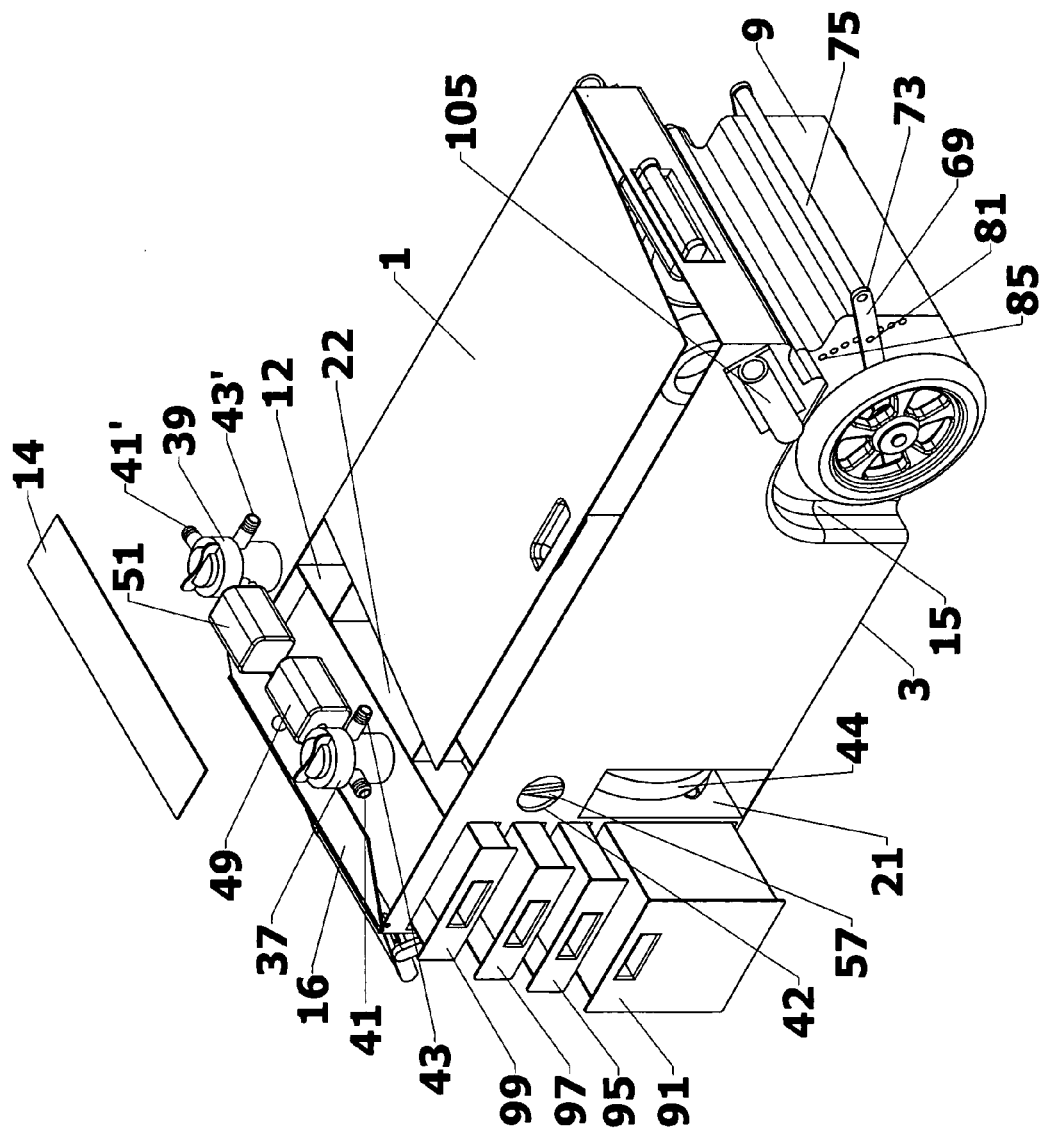
FIG. 5 is an exploded view of the preferred embodiment shown in FIGS. 1, 2, 3 and 4.

The culling device of the present invention includes at least two wheels 63 and 63' so as to provide for and allow simple transportation of the unit without the need for heavy lifting. In a preferred embodiment of the present invention, a pair of wheels are provided and mounted to the device adjacent the left or right housing panel proximate to a bottom extent thereof. In those embodiments of the present invention incorporating a pair of wheels mounted proximate the bottom right panel, the device includes a transportation handle 65 located adjacent the left panel of the cart for raising the device upon its wheel for movement thereof. On the other hand, if the device incorporates a pair of wheels mounted proximate the bottom left panel, then the device will include a transportation handle mounted on the right panel for that same purpose. It is preferred, as illustrated in the figures, that the transportation handle 65 be configured so as to extend away from the cart and unit wheels during use so as to increase the leverage provided thereby in lifting the unit and shifting the weight back towards the handles as illustrated in FIG. 3. A height assistance handle 67 is advantageously mounted upon a panel opposite that upon which the transportation handle is mounted. The purpose of the height assistance handle 67 is to provide a user of the cart with a handhold to grab when raising or lowering the wheels as described in greater detail, below. In any event, movement of the device is similar to movement of a wheel barrel wherein the weight of the unit is shifted to the wheels via a handle located at the opposite end in relation to the wheels.

In certain preferred embodiments of the present invention, a recessed portion of the front, back and bottom panels is configured to form wheel wells 15 and 15'. These wheel wells are provided for location and operation of wheels 63, 63'. In such embodiments, adjustable wheel mounting levers 69 and 69' may be pivotally mounted —at distal ends thereof 71 and 71'—to the cart housing at a point located within the wheel wells adjacent to the bottom of the cart. The wheel levers, at proximal termini thereof (73 and 73') are joined to each other with a cross bar which serves, as discussed above, as a height adjustment handle 75. The cart wheels are rotatably mounted to each lever upon a simple axle which, in turn, is mounted upon each wheel lever proximal to the distal termini thereof. Proximal to the wheels (mounted upon the wheel levers), a lever locking bore 81, passing through the lever, is especially positioned and configured so as to align with a plurality of height adjustment bores 83 prepared within the surface of the wheel well portion of the front and back panel of the cart. The height adjustment bores are located within the recessed portion of the front and back panels generally define—when viewed together—an arch having a radial axis located at the pivot point of the wheel mounting lever.

As discussed above, each of the wheel mounting levers is pivotally mounted to the cart, at a point near the lower portion of the wheel well. Pivoting the levers downward, by means of the height adjustment handle, tends to lower the wheels position in regard to the cart and, in turn, raises a portion of the cart proximate to the wheels away from a surface upon which the cart is positioned. Depending on terrain, a suitable distance between the bottom of the cart and the terrain may be selected by pivoting the levers via the handle. Upon attaining a desired height, an engagement means such as, for example, a simple pin 85 or spring loaded bushing may be utilized to engage both the lever and cart panel. For example, a simple pin or spring loaded bushing may be utilized to fix the lever handles at a selected height by placing the pin or bushing through the lever locking bore and a height adjustment bore closely aligned therewith when the levers are adjusted to the desired height.

As discussed above a cart transportation handle, mounted to the left (or right) side panel of the cart is provided so as to allow the unit to be raised, in a manner very similar to that of a wheel barrel, upward, thereby transferring a majority of the cart's weight to the afore-mentioned wheels. The transportation handle may be located adjacent the left panel for raising the device upon its wheel for movement thereof. On the other hand, if the device incorporates a pair of wheels mounted proximate the bottom left panel, then the device will include a transportation handle mounted on the right panel for that same purpose. It is preferred, as illustrated in FIG. 3, that the transportation handle be configured so as to extend away from the cart and unit wheels during use so as to increase the leverage provided thereby in lifting the unit and shifting the weight back towards the handles. Utilizing such a handle, the cart may be wheeled to a desired location. As mentioned above, depending upon the surface upon which the cart is located, the wheel lever positions are adjusted so as to provide ease of transportation. More specifically, when the cart is to be rolled over soft terrain—such as sand or mud—wherein the wheels may sink to a certain degree, it is highly advantageous to pivot the levers downwards, by means of the height adjustment handle, so as to extend the wheels mounted upon the levers to their lowest position. Lifting the cart upward, by means of the height assistance handle 67 facilitates adjustment of wheel height by momentarily removing weight from the wheel assemblies. Lowering the wheels allows greater clearance between the bottom of the cart and the terrain when the wheels sink into the ground. On firm terrain, such as pavement or boardwalks, the wheel levers may be pivoted towards an upper position so as to increase the ease of raising the unit with the transportation handle.

In addition to the above-described features the first preferred embodiment of the present invention provides all of the above functions and features and, in addition, provides a plurality of drawers and compartments (91, 95, 97 and 99) for the storage of fishing gear, tackle, bait, beverages and food as well as storage tray 18. Storage tray 18 is provided with a hinged cover 16 so as to protect the contents thereof. Preferably, the aforementioned drawers are accessed via the front panel of the housing and are located proximate an end panel (right or left panel) of the unit which does not include the device wheel well or associated mechanism. When the live well of the device is filled with water, the weight of the unit naturally increases. It is preferable that the center of mass of the water is located as proximate to the wheels as possible so as to increased weight of the unit produced thereby is located closer to the axis of the wheels for superior weight handling.

In addition to the above, the first preferred embodiment of the present invention includes a rod holster 105, or, as it may also be referred to with equal meaning, a fishing rod mount, which is mounted upon the cart housing and provides a stable and convenient means for holding a fishing rod both before, during and after a fishing outing. The rod holster serves a similar function to rod holsters and rod mounts affixed to fishing boats.

The terms and expressions which have been employed in the foregoing specification are used therein as terms of description and not limitation, and there is no intention, in the use of such terms and expressions, of excluding equivalents of the features shown and described or portions thereof, it being recognized that the scope of the invention is defined and limited only by the following claims.

I claim:

1. A portable culling cart comprised of a housing, a live well there within, a self contained powered means of filling the live well with water from a marine source and a self contained water circulation/aeration means wherein said powered means of filling and powered means of circulation/aeration means comprises at least one electric pump which is mounted and is operated from within said housing, at least one electric battery having suitable voltage and amperage to power said at least one electric pump, said at least one electric battery being mounted and operated from within said housing;

a length of water pick-up hose having sufficient length to extend from the cart to a marine water source;

at least one water inlet and at least one water outlet mounted upon and providing fluid entry and exit to and from said live well; and a water valve providing for and enabling control of direction of water flow to and from said live well, said valve being especially configured to include at least two valve inlets, one valve outlet and three valve settings, a first valve inlet being in fluid connection with the water pick-up hose, a second valve inlet being in fluid connection with the at least one water outlet of said live well and the valve outlet being in fluid connection with the at least one electric water pump wherein includes a pump, a self-contained power source for powering both the means of filling the live well with water and the circulation/aeration means, wherein when the valve is placed in a first setting, the valve inlets and outlet are configured to connect the water pick-up hose with the at least one water pump and live well water inlet so as to enable filling thereof; when the valve is placed in a second setting, the valve inlets and outlet are configured to connect the live well water outlet with the at least one water pump and live well water inlet so as to provide circulation and aeration of water within the live well; and when the valve is placed in a third setting, fluid connection amongst the at least one water pump, water pick-up hose and live well outlet are closed and sealed, at least two wheels and a transportation handle wherein said cart may be transported upon said two wheels by a user from site to site utilizing said transportation handle, said cart enables powered filling of said live well from a marine source and powered circulation/aeration of water therewithin without need for outside power sources, pumps or manual filling of the live well.

2. The portable culling cart of claim 1 wherein the transportation handle may be extended away from said cart so as to enhance the leverage thereof, and thereafter retracted back into the housing for storage.

3. The portable culling cart of claim 1 wherein the at least two wheels may be extended downward, away from the cart and retracted upward, towards the cart, thereby allowing the height of said cart to be adjusted so as to obtain a desired ground clearance therefore enabling the wheels to operate at varying height positions.

4. The portable culling cart of claim 3 wherein said cart includes a height assistance handle affixed to the housing thereof that facilitates adjustment of said at least two wheels.

5. The portable culling cart of claim 1 wherein said means for filling the live well with water from a marine source and the circulation/aeration means includes two water pumps mounted and operated from within said housing.

6. The portable culling cart of claim 1 wherein said means for filling the live well with water from a marine source and the circulation/aeration means includes two electric batteries.

7. The portable culling cart of claim 1 wherein the live well water inlet is fitted with an aeration head configured to include a plurality of fine spray openings wherein water circulated through said aeration head mixes with air resident over the live well to increase aeration of water within the live well.

8. The portable culling cart of claim 1 wherein a separate aerator pump is mounted within the live well.

9. The portable culling cart of claim 1 wherein said cart also includes a plurality of storage drawers.

10. The portable culling cart of claim 9 wherein at least one of the drawers are insulated.

11. The portable culling cart of claim 1 wherein said cart also includes a fishing rod mount.

12. The portable culling cart of claim 1 wherein said cart includes a utility compartment housing the at least one electric water pump, the at least one electric battery, the length of water pick-up hose and the water valve.

13. The portable culling cart of claim 1 wherein the water valve is additionally configured and adapted to include an integral electrical switch utilized to open and close an electric circuit providing electric current to the at least one electric water pump from said at least one electric battery and wherein when said valve is placed in said first and second position, said integral electrical switch completes the electric circuit and so allows electricity to flow to and power said pump and wherein when valve is place in said third position said integrated electrical switch interrupts the circuit.

* * * * *